US007581166B2

United States Patent
Renger et al.

(10) Patent No.: US 7,581,166 B2
(45) Date of Patent: Aug. 25, 2009

(54) SYSTEM AND METHOD OF COLLECTING, CORRELATING, AND AGGREGATING STRUCTURED EDITED CONTENT AND NON-EDITED CONTENT

(75) Inventors: Bernard S Renger, New Providence, NJ (US); Rittwik Jana, Parsippany, NJ (US); Yih-Farn Robin Chen, Bridgewater, NJ (US); Serban Vadim Jora, Roanoke, VA (US); Bin Wei, Basking Ridge, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 402 days.

(21) Appl. No.: 11/459,326

(22) Filed: Jul. 21, 2006

(65) Prior Publication Data

US 2008/0034056 A1 Feb. 7, 2008

(51) Int. Cl.
*G06F 17/00* (2006.01)
(52) U.S. Cl. .................. 715/201; 715/234; 715/700; 715/738; 709/219; 707/1; 707/10; 707/100
(58) Field of Classification Search .......... 709/203, 709/206, 217, 219, 246; 707/1, 3, 4, 10, 707/100–102, 104.1; 715/201, 234, 700, 715/738

See application file for complete search history.

(56) References Cited

U.S. PATENT DOCUMENTS

| 6,877,134 | B1 * | 4/2005 | Fuller et al. ............. 715/202 |
| 2005/0064852 | A1 | 3/2005 | Baldursson |
| 2007/0118873 | A1 * | 5/2007 | Houh et al. .............. 725/136 |
| 2007/0162566 | A1 * | 7/2007 | Desai et al. ............. 709/219 |

* cited by examiner

*Primary Examiner*—Doug Hutton
*Assistant Examiner*—James H Blackwell
(74) *Attorney, Agent, or Firm*—Greenblum & Bernstein P.L.C.

(57) ABSTRACT

A mobile multimedia content aggregation and dissemination platform is provided that aims to automate the creation, collection, correlation, aggregation, and dissemination of RSS, ATOM or other syndicated-style data formats along with non-syndicated content for blogs and for searching by interested parties. Then non-syndicated content may be substantially any type of multimedia content that has not yet been edited or that has been edited. The system and method may receive data content that originated from a syndicated information source along with other data content that originated from a non-syndicated information source. The system and method convert both types of content into, at least, blog information and blog data. The blog information comprising, information that points to a storage location of the blog data. The exemplary method further enables a user to search the blog data regardless of whether the blog data originated from a syndicated data source or non-syndicated data source.

26 Claims, 6 Drawing Sheets

SYSTEM AND METHOD OF COLLECTING, CORRELATING, AND AGGREGATING STRUCTURED EDITED CONTENT AND NON-EDITED CONTENT

This application is related to and was filed on the same day as U.S. patent applications 11/459,327, titled, "Content Dissemination Using a Multi-Protocol Converter" and 11/459,321, titled, "System and Method of Providing a Context-Aware Personalized Blogging Agent," which are both hereby incorporated by reference.

BACKGROUND OF THE INVENTION

Embodiments of the present invention are related to blogging, and more particularly to a system and method that disseminate data content comprised of multiple different data formats for transmission through different protocols and converts the content into a standardized content for use in a user's blog and that can be searched by third party users.

The emergence of RSS (Really Simple Syndication) technologies and weblogs (aka. blogs) has helped transform the Web into a service platform that competes with traditional news media for timely content publication, aggregation, and delivery. RSS is a Web content syndication format and is a dialect of XML. All RSS files must conform to the XML 1.0 specification, as published on the World Wide Web Consortium (W3C) website. Unfortunately, the creation and consumption of such timely blog updates are still done, for the most part, manually on desktop computers today. Moreover, many valuable information sources are not yet available as or integrated with RSS sources or other blogging tools. Furthermore, mobile users want to be able to fully participate in the Web 2.0 [http://en.wikipedia.org/wiki//web_2.0] phenomenon by having the ability to publish and access timely news worthy updates directly from their mobile devices.

Blogging has become a quickly spreading passion among various Internet users. A blog entry is essentially a text entry into a Web page that results in a publication of experiences and opinions. A blog entry can also include images, audio, video, and links to other locations on the Internet. The earliest weblogs were nothing more than updated Web sites with grassroots efforts like Slashdot.org. These early weblogs (blogs) were created and maintained by a small number of people. Readers had to visit the blog sites regularly to get the latest updates. Later, these blog sites began to publish machine readable updates in syndication languages such as in RSS or Atom for easy consumption. Personal blog sites such as Xanga [http://xanga.com] and Blogger [http://blogger.com] allowed Web users to actively write to the Web instead of simply reading from the Web.

The emergence of using RSS technologies along with weblogs for spreading timely and personalized information on the Internet has presented challenges to traditional news and media industries. More and more Internet users are finding that they can acquire informational updates from RSS sources and blog sites faster and easier than before. Rather than remembering to get updates on a daily basis, the bloggers configure their RSS browser to automatically check for specified news updates. Since the updates' format is machine readable, the site can present the results in a summarized format to be shown to the bloggers. This aggregation process (e.g., displaying news headlines with individual items sorted by time) allows one to completely customize a fetched site and have it automatically updated on an ongoing basis. For example and as shown in FIG. 3, an Internet based browser, Flock [http://www.Flock.com], with an embedded RSS reader, allows desktop users to easily aggregate several RSS feeds (such as news sources from CNN, CNet News, NY Times, etc.). An aggregator or news aggregator is a type of computer program (such as application software or a Web application) that collects syndicated Web content, such as RSS formatted information and XML feeds from weblogs. An aggregator is able to subscribe to a feed, check for new content at user-determined intervals, and retrieve the content. It is important to note that presently many RSS feeds are edited by a human prior to being provided as an RSS feed by an RSS provider. RSS is used for syndicated news feeds that may be searchable at Internet sites like Blogdigger.com. RSS is not presently provided for disseminating unedited, searchable information.

In FIG. 3, an example of an RSS data feed based Web page 5 is shown. The source 1 of an RSS feed is provided in the first column. A time (and perhaps date) stamp 2 of the RSS feed is provided in a second column of the display. A subject 3 of the RSS feed and the content 4 of the feed are provided in a text format. The combination of the source 1, time stamp 2, subject 3, and content 4 could be considered a type of blog entry in this particular Web page 5. The contents of the Web page 5 may be constructed from a blog 6 that was generated from an RSS feed or feeds.

As discussed above, the creation and consumption of blogs are mostly performed manually on desktop computers. Moreover, there are information sources that contain timely information about a person's or entity's status or situation, such as one that provides a user's geographic location, a user's appointment/calendar data, or information from various sensor networks (i.e., non-traditional content), but these are neither available or integrated with RSS or other syndicated data sources, nor are they searchable by a third party user. In addition, users are requesting to be able to send, search and receive blog information (perhaps in a condensed form) on their mobile devices or to be able to publish or search audio/video blogs that combine the Web and the richness of a multimedia experience. Furthermore, storage of syndicated data along with non-syndicated multi-media content for usage in a user's blog site while keeping all the information searchable by a third party is not an available feature to date.

SUMMARY OF THE INVENTION

In view of the shortcomings of the aforementioned limitations on blog creation or retrieval, as well as other disadvantages not specifically mentioned above, it is apparent that there exists a need for a system and method that can collect, correlate, and aggregate both structured-edited content, such as syndicated-RSS, and non-edited content so that a resulting aggregated feed is in a syndicated-style data content format that can be used and/or searched by users. Embodiments of the invention provide a means for receiving syndicated-style data content and non-syndicated content so that both types of content can be easily stored and searched in blogs or in other non-syndicated user created content presentation or in some storage sites. Non-edited content is generally content that does not come from a syndicated content/data source and has not been edited by a human after created by a first human or source device. Embodiments of the present invention also provide a system and method that allow personal blog entries, submitted by a mobile user from substantially any kind of mobile device, to be mixed with information sources from, for example standard and non-standard RSS information sources or any syndicated information source, to be assembled, included on a user's blog site, and searched by a third party user.

An exemplary system in accordance with an embodiment of the invention collects, correlates, and aggregates syndicated-format edited content along with non-edited content. Such an exemplary system comprises an infolet that receives syndicated-format edited content that comprises standard source system attributes. Syndicated-format edited content is content that comes from a syndicated content source and is formatted in an accepted syndicated content formats, such as RSS, ATOM or other standard syndicated content data formats. Furthermore, syndicated-format edited content means that the content is not in its raw format from an originating source, but instead one that has been edited and reviewed by the syndicating source prior to being formatted in the syndicated-format and disseminated or distributed.

The exemplary system further comprises an access gateway that receives non-edited content. The non-edited content comprises non-text content. Non-edited content means content that is substantially in a raw format from its originating source. The non-edited content is data that has not been transformed or edited by a human prior to being received by the gateway. A couple of examples of non-edited content may be a voice message from a user, an image taken by a digital camera, a video stream from a user's video camera, or a text message sent from a personal digital assistant (PDA).

An exemplary embodiment may also include a content processor that, among other possible processing functions, converts at least a portion of the non-text content into text content. The converted or extracted text content may be used to fill a descriptor of the description schema attributes for the non-text content. The description schema attributes help to describe, categorize, and make the non-text content searchable. A content database is used to store the non-text content, the text content and the one or more description schema attributes. The content database provides pointers that point to the storage locations of the non-text content, the text content, and if necessary, the one or more description schema attributes. A blog infolet provides a syndicated-style data feed to a user's blog.

An exemplary embodiment may further comprise an aggregator infolet that correlates the syndicated-format edited content along with the syndicated-style data feed into a correlated cluster set according to a user's query. The aggregator correlates the content and data feed using both the standard source system attributes and the description schema attributes. The aggregator infolet may also present the correlated cluster set as an aggregated syndicated-style data feed that incorporates information that came from a syndicated data source and information that came from a non-edited data source.

The syndicated-style data may be RSS, ATOM or another accepted data format that is provided from a syndicated data source, such as the Associated Press website [http:www.ap.org] or others.

In various embodiments of the invention, the non-edited content may include one or more types of content. The different types of content may include video content; graphic content wherein the content processor categorizes the non-text content based on an identification of an item or element within the video or graphic content. Other types of non-edited content may be content sent by a facsimile machine or scanner device wherein an exemplary system in accordance with an embodiment of the invention utilizes a character recognition module to aid in categorizing the facsimile content and to generate a description schema. Audio information may also be received by the exemplary system. The system may use a speech recognition module to decipher at least a portion of the audio information and to provide some text-content to the content processor.

Any or all of the non-edited content may originate from a consumer electronic device or a non-syndicated data content source. Such consumer electronic devices may provide non-edited content in the general or specific form of at least one of: photos, graphics, video, messages, facsimiles, audio, voice, calendar events, timed or dated events, financial data, currency exchange rates, coupons, directions, and emergency instructions or information, mobile device data and scanner or digital camera formats.

It should be understood that this summary of the invention is not intended to discuss or represent each embodiment or every aspect of the present invention.

BRIEF DESCRIPTION OF THE DRAWINGS

Other objects, features, and characteristics of the invention as well as methods of operation and functions of related elements of structure, and the combination of parts and economics of manufacture will become more apparent upon consideration of the following Detailed Description of Embodiments of the Invention and the appended claims with reference to the accompanying drawings. All of which form a part of the specification wherein like reference numerals designate corresponding parts or elements in the various figures that may not be drawn to scale, and wherein:

DETAILED DESCRIPTION OF THE EMBODIMENTS OF THE INVENTION

Figure 1:
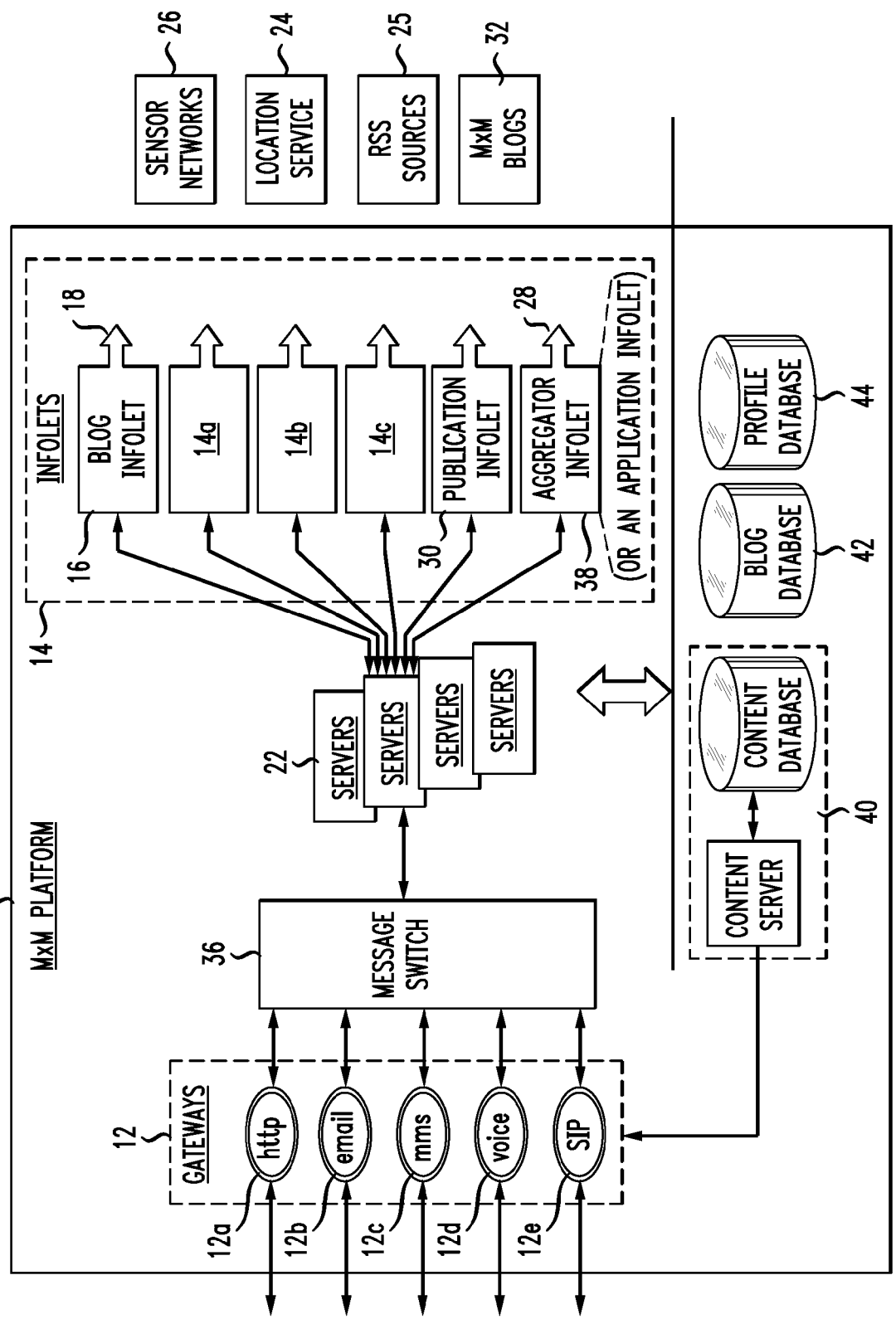
FIG. 1 is an architecture diagram of an exemplary mobile multimedia content aggregation and dissemination platform.

Embodiments of the present invention provide a mobile multimedia content aggregation and dissemination platform that automates the creation, collection, aggregation, and dissemination of RSS and non-RSS information to interested parties, whether the interested parties are using desktop computers (desktops) or mobile devices. It should be understood that RSS information is just one type of a syndicated content format. Thus, it should be understood that embodiments of the invention are not just limited to RSS, but may provide a content aggregation and dissemination platform that automates the creation, collection, aggregation and dissemination of one or more syndicated content formats and non-syndicated content information to interested parties. An example of another syndicated content format that is not RSS and that is becoming more commonly used is the content format known as ATOM. As such, the embodiments described herein are generally discussed with respect to RSS formatted data, but other syndicated-style data formats can be used in embodiments of the invention.

An exemplary platform converts data or postings from various information sources (sensor networks, location servers, calendar servers, news sources, etc.) into a format that can be aggregated automatically along with blog entries submitted manually by users. Intelligent mechanisms are provided to query and filter the aggregated content and to adapt the content for dissemination to subscribers who are interested in relevant topics. Various embodiments of the invention are related to automating the aggregation of RSS feeds thereby allowing a user to view updates and data from selected Web sites that are correlated with non-traditional RSS content that the exemplary platform assembles, based on, for example, a user's personal profile. Note that, as a by-product of an exemplary platform, a user does not need to have an RSS browser to get timely updates. Exemplary embodiments may be backward compatible with previous mobile service platforms in the sense that an exemplary platform can disseminate content by using existing communication channels that communicate to a wide range of devices, including cell phones, pagers, PDAs, and other personal electronic wireless devices.

RSS which was originally short for RDF Site Summary or Rich Site Summary, but now is generally know as Really Simple Syndication, is an XML format for syndicating Web content. A Web site that allows other sites to publish some of its content may create an RSS document and may register the document with an RSS publisher. A user who can read RSS-distributed content can use the content on a different site. Syndicated content has historically included such data as news feeds, events listings, news stories, headlines, project updates, excerpts from discussion forums, or even corporate information. The RSS content has also historically always been edited by a human prior to becoming syndicated Web content. RSS was originally developed by Netscape.

An architecture diagram of an exemplary mobile multimedia content aggregation and dissemination platform (MxM Platform) 10 is shown in FIG. 1. The exemplary platform 10 handles timely updates from various information sources. The platform 10 consists of gateways 12 that send and receive messages and data to and from non-platform devices using different protocols (i.e., http, email, SIMS, MMS, voice, fax, SIP, instant messaging, etc.). The exemplary platform 10 further comprises infolets 14. The infolets 14 implement associated application logic and usually provide access to one or more sources of standard and non-standard information. An infolet's output needs to conform to the destination delivery context established for the user session. The platform 10 offers support for information transcoding (format conversion) in the form of a framework that can be used by the infolet provider. For example, the blog infolet 16 converts a blog entry submitted by a user through any of the gateways 12 into a blog information item 18. RSS-enabled infolets 14a, b and c, operating within each server(s) 22, implement protocol interfaces that access various information sources (such as a location service 24, RSS source service 25, sensor service 26, etc.). Such infolets 14 also include and implement a module that converts the retrieved information from the various services 24 and 26 into a properly formatted RSS data feed. In general, the conversion of retrieved information into a format that facilitates creating RSS feeds is performed in a timely manner by an infolet making the data amenable for aggregation with other sources of information. The blog infolet 16 is also capable of presenting its information in an RSS feed.

The aggregator infolet 38 assembles RSS feeds from other infolets to provide a unique aggregated RSS feed 28. This aggregated feed 28 is then ready for querying, filtering or publishing to other media gateways. Note that the aggregator infolet 38 can be any application infolet that uses a third party aggregator library and handles the actual aggregation task. Content from the aggregated feed 28 can be adapted and provided for delivery to subscribers who are interested in any event reported in the aggregated RSS feed 28. The aggregation itself takes into account user preferences and/or the user's service profile that may be specified as weights of the aggregation criteria. This aggregation procedure is a weighted clustering mechanism. The publication infolet 30, for example, is used to publish personalized and filtered RSS content from the aggregated feed 28 onto a user's personal or group blog site 32 maintained by the platform 10. A delivery module inside the blog infolet 16 or the aggregator infolet 38 is used to adapt user selected portions of the aggregated RSS feed (18 or 28) for delivery as content to users' mobile or other gateway 12 related devices.

A user's blog description schema is where a user defines the attributes used to describe the data items. Such attributes may include, but are not limited to a time, location, direction, type, hobby, event, genre, species, culture, religion, size, shape, color, any physical attribute, topic, etc. For example, a user may have a blog site that is about Ford Mustang automobiles. The user may define attributes for the blog item descriptors based on an automobile brand, model, year, color, part, date, geographic location, VIN, level of customization, just to name a few. These user defined attributes may not be related or similar to standardized or syndicated RSS or ATOM data attributes that are commonly accepted by the media houses that produce the standardized or syndicated RSS or ATOM feeds. A 'description schema' can be defined by each user for his or her blogs and contains descriptive information as a set of attributes constrained by type and type specific restrictions. A user's service profile can be defined as where user preferences with respect to a particular service are stored. For example, the default blog to be used when none is specified in a user posting is part of the user's profile with respect to the Blog infolet. A user's service profile can also contain, in this particular case, shortcuts to predefined user queries, etc.

Figure 4:
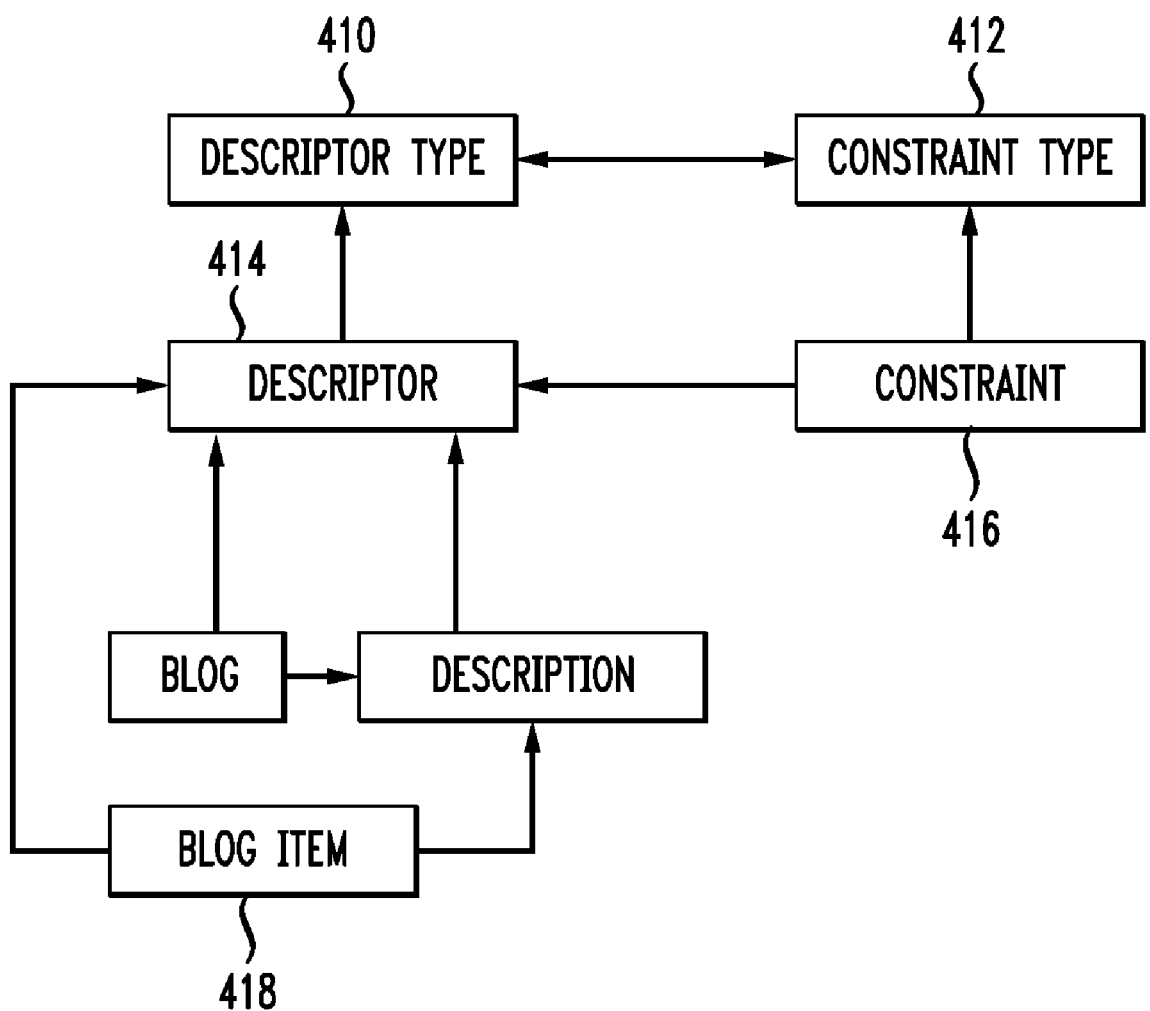
FIG. 4 is an exemplary modeling of how descriptors for content annotations are established.

In FIG. 4, exemplary blog item attributes are described. Every blog and blog item can be annotated with a set of name-value pairs. The names and values may be established by the creator of the blog or may partially come from the data items in the blog. A name together with an associated value type make up a 'description schema attribute'; a set of such attributes makes up a descriptor. Thus, a blog or blog item is annotated by a set of descriptions, wherein a description is an instance of a descriptor (i.e., an actual value of the type indicated by the descriptor). Embodiments of the invention should have a simple and extensible type system to allow for the specification of the descriptors.

FIG. 4 is an exemplary model of an annotation system that may be used to organize and annotate every blog and blog item with a descriptor. The following are some examples of how the model is used.

A descriptor attribute type 410 may be, for example, a Number, a Date, a Location, a Set, or a Classification, just to name a few, and can be further restricted by a constraint type. A constraint type 412 may be, for example, a Type, a Domain, a Size, or a Pattern (regular expression), just to name a few. In an embodiment, for example, Java implementations of interfaces defined by a blogging framework need to be provided with both the descriptor type 410 and the constraint type 412.

The exemplary system will specify proper syntax and validate a user's entries. The syntax of a constraint should be specified generally, regardless of the attribute type it is associated with. It should be understood that not all constraint types 412 can be applied to every descriptor type 410. The relationship between descriptor type 410 and constraint type 412 is such that the descriptor type 410 can be (or must not be) constrained through the given constraint type 412. For example:

A Number descriptor 414 can be constrained by 416, a domain: [1 . . . 10]

A Set descriptor 414 can be constrained by 416, a Type (for its elements) and/or Size and/or Domain:
Number—can only accept numbers
(,3)—not more than three
(a, b, c, d, e)—only these values are allowed.
A Classification can be constrained by a Domain:
(a(a1, a2, a3), b(b1, b2(b21, b22), b3, b4), c)—this is a hierarchical domain.

These instantiations will take place in the descriptor 414 and constraint 416. When an actual descriptor is declared, a set of constraints can be associated with its attributes (i.e., a subset of the constraint type 412 associated with that particular descriptor type 410). For example, a Rank descriptor attribute 414 can be a type Number and it imposes the Domain constraint [1 . . . 10] and can be used to annotate blog items 418 with a Rank. When a Rank descriptor 414 is defined as in this example and is instantiated for a blog item 418, it will take a value, for example, between 1 and 10 in this case.

An unconstrained Set may allow a user to provide any group of values desired (e.g., apple, horse, p2p).

Similarly, an unconstrained Classification would allow a user to provide any group of values desired (e.g., apple/ipod/accessory).

To define a Categorization descriptor attribute 414 for a blog's items, a user may use a Classification descriptor type 410 with a constraint 416 by a Domain constraint type 412, specified as: (work(ATT, OpenSource), sports(climbing, basketball, tennis), hobbies (cars, guitar, sociology)).

Thus, a user defines the attributes used to describe the information items provided in the user's blog. When a new information item is being added to a user's blog, the user may be queried to provide the information needed to establish a description for the new blog item.

The specification of a descriptor (e.g., attributes, their types and constraints) can be provided with an information source and one or more information source data items. Some examples include, without limitation:

EXAMPLE 1

An Internal Information Source, a Blog, Information Sources Items, and Blog Items Blog Descriptor
attribute category of type string
attribute frequency of type string (constrained to hourly, daily, weekly, monthly)
Blog Item Descriptor (A Set of 'Description Schema Attributes')
attribute repairDate of type dateTime
attribute repairLocation of type address
attribute dealership of type string It should be noted that the exemplary set of types is defined by the service platform. The service platform also defines the ways to constrain types. For example, an attribute of type 'string' can be constrained by enumerating the set of allowed values. In the case of a blog, the set of attributes that make up the descriptor can be specified by the user when the blog is created. When an entry is posted to the blog, the user making the post will be queried to specify the values for each attribute part of the descriptor. The set of actual values make up the description of the blog item.

A Blog Entry:
Subject: poor repair
Summary: paid top $, got nothing done
Description:
Attribute: repairDate, Value: 2006-03-21
Attribute:repairLocation, Value: Roanoke, Va.
Attribute:dealership, Value: FirstTeam The RSS feed representation of the blog content will contain the descriptions through an XML namespace based extension model:

```
<item>
    <title>poor repair</title>
    <description>paid top $, got nothing done</description>
    <author>jora</author>
    <guid>jora.autos.41</guid>
    <pubDate>Mon 17-Apr-2006 14:42:12</pubDate>
    <category>blog</category>
    <autos:description
    xmlns:autos="http://mxm.research.att.com/blog/jora/autos">
        <autos:repairDate>2006-03-21</autos:repairDate>
        <autos:repairLocation>Roanoke,
        VA</autos:repairLocation>
        <autos:dealership>FirstTeam</autos:dealership>
    </autos:description>
</item>
```

EXAMPLE 2

Data from an External Information Source

Data from a non-RSS information source, such as, Exchange Server, calendar information. The descriptor of, for example, an RSS feed produced by an infolet handling information provided by the Exchange server is specified by the infolet.

ExchangeCalendarInfolet Item Descriptor:
Attribute priority of type string (constrained to low, medium, high)
Attribute meeting of type boolean
Attribute meetingLocation of type address For each calendar item, the infolet can 'calculate' the descriptive attributes from the available exchange calendar information (which is naturally richer information). When the infolet provides the RSS feed corresponding to a user's Exchange calendar information, the description is calculated and added to the feed:

```
<item>
    <title>poor repair</title>
    <description>paid top $, got nothing done</description>
    <author>jora</author>
    <guid>jora.autos.41</guid>
    <pubDate>Mon 10-Jan-2006 14:42:12</pubDate>
    <category>Exchange calendar</category>
    <calendar:description
    xmlns:calendar="http://mxm.research.att.com/exchange/calender">
        <calendar:priority>low</calendar:meetingLocation>
        <calender:meeting>true</calendar:meetingLocation>
        <calendar:meetingLocation>Florham
        Park,NJ</calendar:meetingLocation>
    </calendar:description>
</item>
```

EXAMPLE 3

Data from an External RSS Feed

Data from an RSS information source, such as an External information source that is already available in RSS format can be enriched by calculating attributes from the existing information.

Finance News Feed Item Descriptor:

Attribute company of type string

Attribute stock of type string

Attribute eventLocation of type address

When the RSS infolet retrieves the feed, it analyzes the 'description' element of each item and looks for whatever seems to be the company name, and extracts it and places it in the description. From the company name, the RSS infolet can figure out the stock symbol for the company and can also add the stock symbol to the description. In a similar way, the event location could be found in the description or retrieved as the company's headquarters. The resulting feed is shown below:

```
<item>
    <title>GM Will Pay Lower Prices for Delphi Parts (AP)</title>
    <link>http://us.rd.yahoo.com/finance/news/rss/story/
    *http://us.rd.yahoo.com/finance/news/topnews/
    *http://biz.yahoo.com/ap/060501/delphi.html?.v =2</link>
    <description>General Motors Corp. will pay lower prices for parts
    from Delphi Corp. after it failed to reach an agreement to continue
    paying higher rates to the auto supplier, Delphi said Monday in a
    filing with federal regulators.
    </description>
    <guid isPermaLink="false">yahoo_finance/2182016378</guid>
    <pubDate>Mon, 1 May 2006 18:54:15 GMT</pubDate>
    <finance:description
    xmlns:finance="http://mxm.research.att.com/news/finance">
        <finance:company>General Motors Corp.</finance:company>
        <finance:stock>GM</finance:stock>
        <finance:eventLocation>Detroit, MI</finance:eventLocation>
    </finance:description>
</item>
```

Referring back to FIG. 1, wherein the exemplary platform 10 is shown, the gateways 12a-e receive and provide information to various different kinds of mobile and non-mobile devices that support different protocols. For example, if a person has a mobile phone, the user may use the phone to contact the voice gateway 12d by calling a phone number associated with the voice gateway 12d. The user may talk directly to the voice gateway 12d. Whatever the user says on his mobile phone to the voice gateway 12d will be recorded and transcribed via a voice-to-text module (that may be implemented on a set of servers that act as a resource outside of the platform 10) and become a blog entry that is submitted to the platform 10. The user who called the voice gateway 12d can be identified by a voice PIN number matched against a profile database 44. The voice gateway stores the voice message in the content database and tags the voice blog entry from the user with an identification pointer (typically represented as a URL) so that the blog infolet 16 can store information in the blog database 42. Information stored in the blog database 42 may be stored as blog information items that have tags, pointers, or URLs (collectively "pointers") associated therewith that comprise a description for each blog information item. The original recording is stored and alternative representations can be created, for example through ASR whereby a text version of an audio file can be effectively created. The blog entry will later be posted to the specific user's blog site. Additional information about the voice gateway 12d is provided below in the discussion of FIG. 2C.

If a user uses a cellular/mobile phone or a desktop computer that allows him to send email, the user can use the email gateway 12b to submit blog entries. The user emails the blog entries to a specific email address for either his blog entry or a general email address that tags the entry and determines where the blog entry should go based on looking up the originating address of the email in the profile database. Below, more discussion about the email gateway 12b will be provided with respect to FIG. 2A. Web pages can be similarly provided to the http gateway 12a. Video blog entries could be provided to the SIP gateway 12e (see, discussion of FIG. 2D). Multimedia messages can be provided by a user to the MMS gateway 12c as well (see, discussion of FIG. 2E).

A user, who is using a mobile device, may send information to any one of the gateways 12. The gateways receive information, whether it is spoken, written, photographic, audio, or video, then store the media content in the content database 40 and standardizes the information with pointers to the media content in a predetermined fashion. The standardized information is provided to the message switch 36.

The message switch 36 basically separates the gateways 12 from the servers 22. In some embodiments of the invention, the gateways are considered front end gateways and the servers 22 are considered back end servers. Any request or data that comes into the platform 10 via any of the gateways 12 can be sent, via the message switch 36, to any of the servers 22. The message switch 36 may handle load balancing of the incoming or outbound information and data, which is a typical way of handling application messaging.

The servers 22 comprise database storage capacity and may be considered a large storage container for many of the pieces of blog information that flow in and out of the exemplary platform 10. The servers 22 are associated with multiple infolets. The infolets are in data communication with the servers 22. An infolet (16, 14a-14c, 30, 38) may be comprised of a data receiver that is configured to receive information in one format and translate the information into, perhaps, another format.

Referring first to the blog infolet 16, when the gateway 12 receives a request from a user, the gateway determines that the request should go to the blog infolet 16 if the request is one from the user requesting that the information provided should be included into the user's blog site. If the information is intended for the user's blog site, the information is passed from the gateways 12 through the message switch 36 to the blog infolet 16 wherein the information is processed and formatted appropriately and provided for proper storage into the blog database 42.

Referring now to FIGS. 2A-2E, exemplary block diagrams of the gateway agent 12 and the blog infolet 16 along with some associated databases 40, 42, and 44 are provided.

Figure 2A:
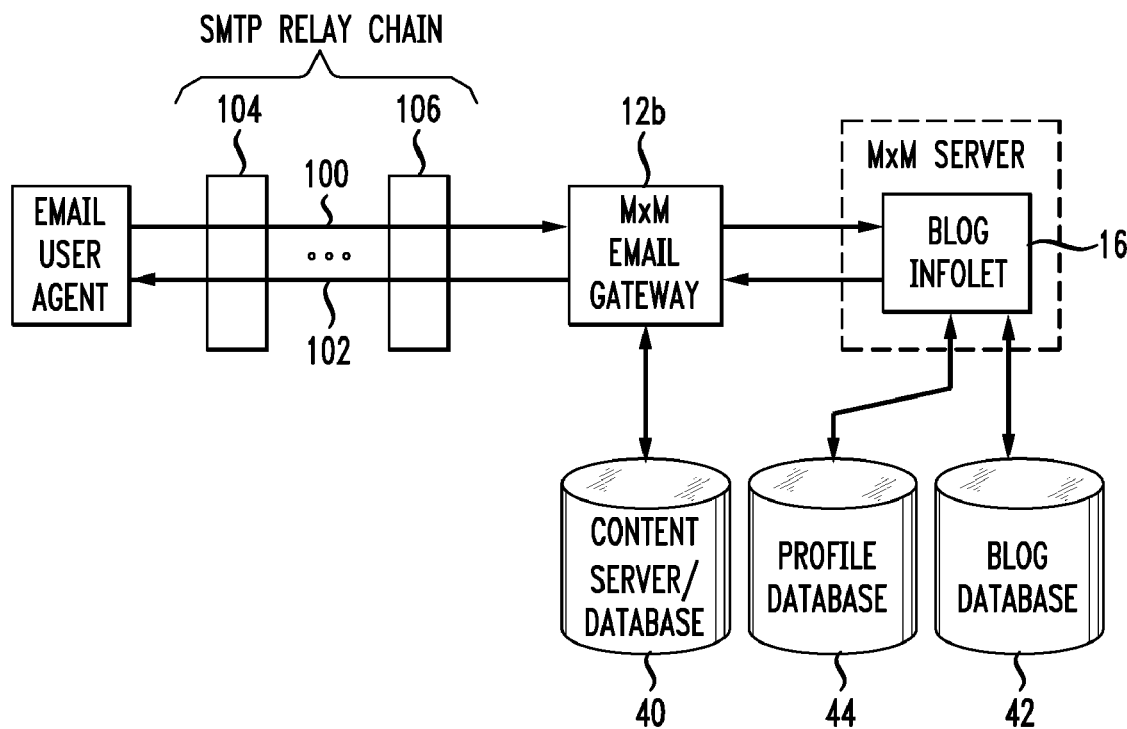
FIG. 2A is an exemplary block diagram architecture of an email gateway, a blog infolet and associated databases.

For example, in FIG. 2A, when a email gateway 12b receives a piece of non-RSS or a non-syndicated-style content from a user and the content is, for example, a picture, the picture (e.g., the jpeg data, bmp data, etc.) will be stored in a content database 40. The email gateway 12b receives a pointer from the content server 40, which points to the location of the stored picture content in the content database 40. The email gateway 12b sends the pointer, via the servers 22 to the blog infolet 16. It is important to understand that the email gateway 12b can receive blog items from multiple users in multiple formats including picture, text, graphics, audio, and video data formats. In embodiments of the present invention, text data may be sent directly through the message switch 36 to the blog infolet 16. But, other data items like video and picture data are stored in the content database 40 or other storage mechanism while a URL to their location in the database 40 is provided to the blog infolet 16. The platform 10 can also be set up such that only predetermined content types are published to the content server 40. In another embodiment, the text data may be stored in the content data base 40 or other data storage mechanism with a URL to the text data's storage location provided to the blog infolet 16.

Still referring to FIG. 2A, bi-directional communication 100, 102 to the email gateway 12b is carried out via a set of SMTP relays 104, 106. When an inbound user request 100 arrives at the email gateway 12b, an authentication procedure is performed to determine the identity of the user initiating the request. The content that is attached to the request is published to the content server/database 40. In return, URLs for each piece of content published to the content server/database 40 are provided to and obtained by the email gateway 12b. The publication of the content in the content server 40 by the email gateway 12b is one step of a content processing chain that occurs in the gateway. Such a content processing chain is the assembly of a set of content processors with each performing one dedicated operation on the content. The result being a structured format of non-RSS information that can be provided by the email gateway 12b to the blog infolet 16.

The inbound user request 100 that has been changed by the email gateway 12 into structured non-RSS information contains the URLs for each piece of content published to the content server 40 instead of the actual content submitted by the user. A part of the content is identified by the email gateway 12b as being a command line and is sent along in the request (i.e., the structured non-RSS information). Furthermore, the types of content in the request that are published in the content server 40 and the types of content that should be propagated directly to the blog infolet 16 can be configured in the email gateway's content processing chain.

After taking into account user defined preferences that have been stored in a user profile database 44, the blog infolet 16 stores a blog information item (e.g., a blog entry) into the blog database 42. The blog entry contains the URLs that point to the user supplied content now residing on the content server 40. In some embodiments of the invention, a confirmation of receipt of the blog information item containing an identifier of a new blog entry is provided back to the user from the blog infolet 16, through the email gateway 12b and by the SMTP relay chains 106 and 104. Conversely, still referring to FIG. 2A, if a user request, indicating that the blog information item or the entire blog is desired, is sent to the blog infolet 16 in the server platform 10, then the user preferences are accounted for via the profile database 44. Then the blog information is retrieved from the blog database 42. The blog infolet 16 then provides the retrieved blog information, in accordance with the user's service profile and the user session delivery context, to the email gateway 12b. The retrieved blog information will contain the appropriate URLs of any data associated with the content at the time of original content submission. Delivery context is the set of all the attributes constraining the content delivery process during a user session. It includes the static device profile, user preferences, dynamic network capacity information, etc.

Since SMTP messaging requires the actual content to be embedded in the message, the email gateway 12b retrieves the associated data from the content server 40 using the URLs while composing the outgoing MIME message. The outgoing MIME message is sent via the SMPT relay chain 106, 104 to the user.

Figure 2B:
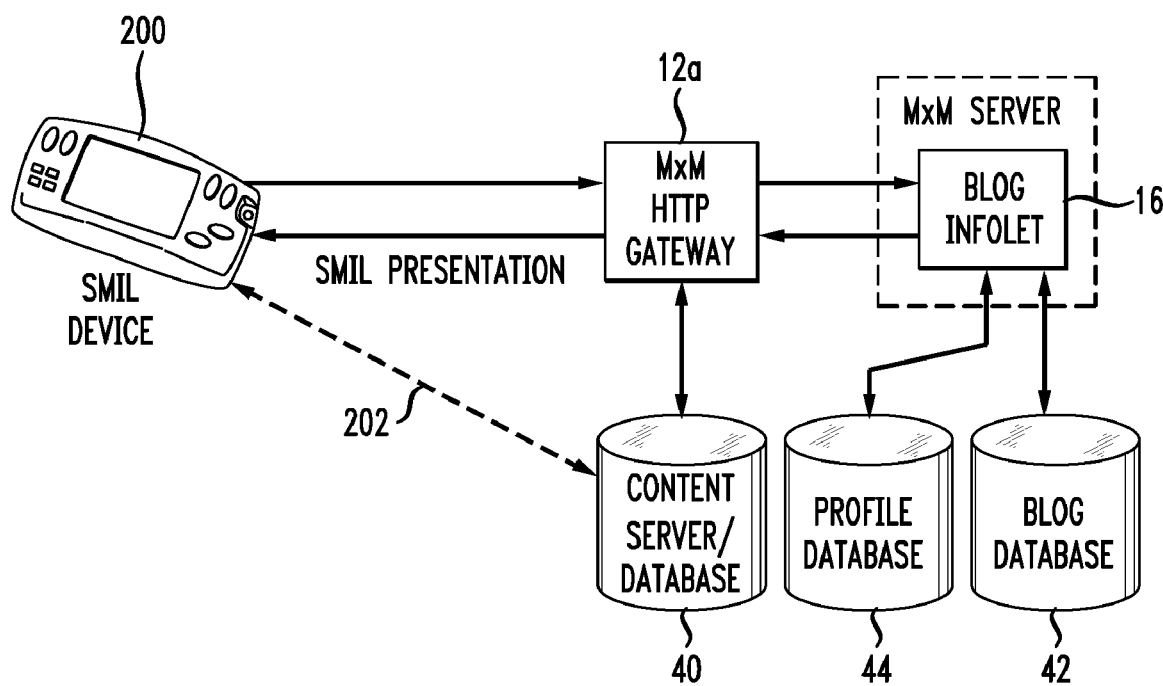
FIG. 2B is an exemplary block diagram architecture of Synchronized Multimedia Integration Language (SMIL) retrieval through an HTTP gateway, a blog infolet and associated databases.

FIG. 2B is an exemplary block diagram of the architecture of SMIL retrieval through the HTTP gateway 12a, a blog infolet 16 and associated databases. When a user retrieves content of a blog via a SMIL client 200, the SMIL document (presentation) returned by an exemplary platform 10 contains, due to SMIL specifics, only the URLs of the requested content. It is the user agent that needs to retrieve the actual content, using the URLs, from the content server 40 (shown via the dotted arrows 202 between the SMIL device and the content server/database).

SMIL clients 200 can access the platform 10 via the HTTP gateway 12a and presently can only be used for retrieval of content. The blog infolet 16 executes a content selection step in this situation because content such as Word documents, PowerPoint presentations, etc. (in general application/*content type) cannot be a part of a SMIL presentation.

Figure 2C:
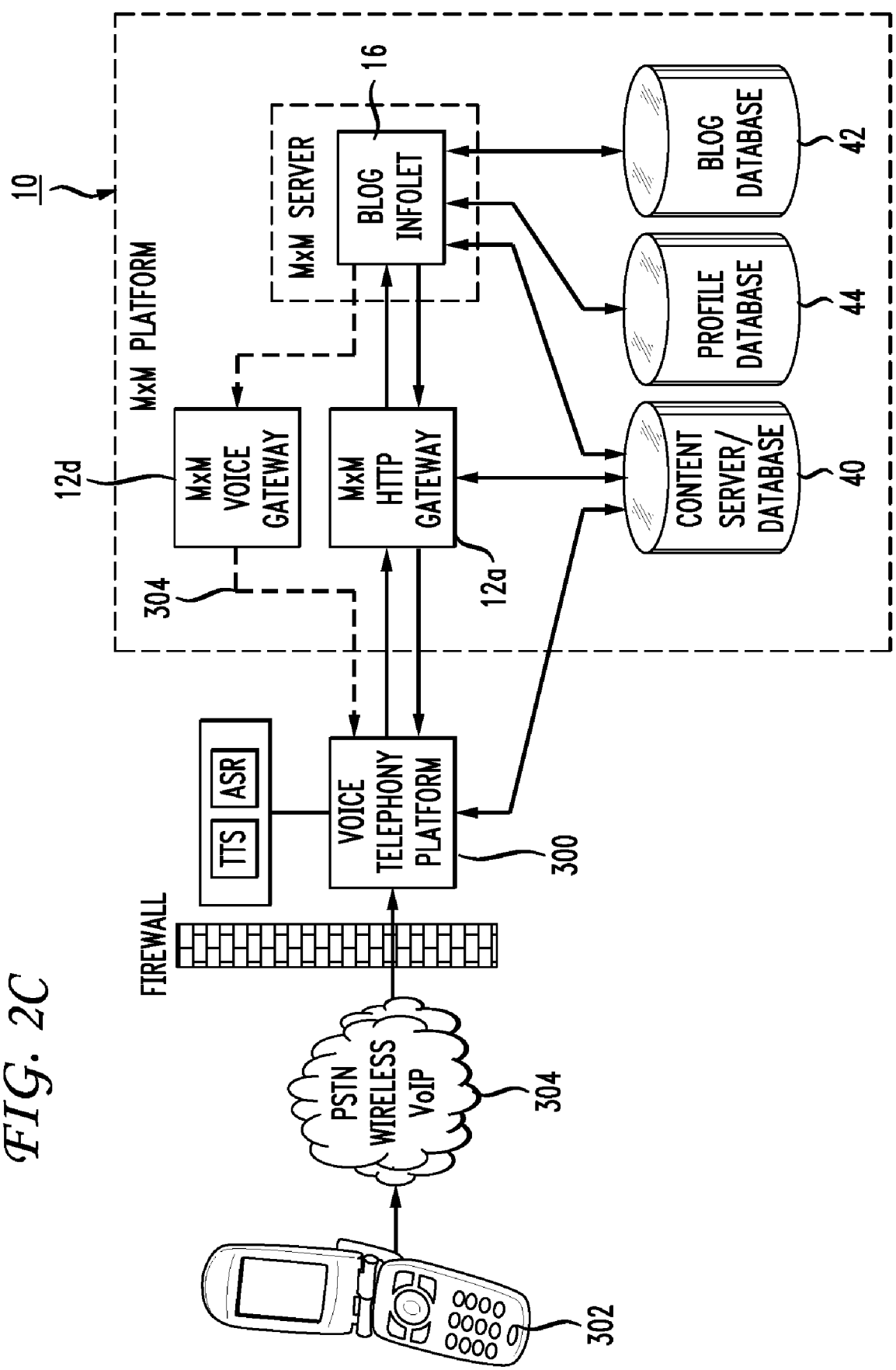
FIG. 2C is an exemplary block diagram architecture of a voice gateway, a blog infolet and associated databases.

FIG. 2C is an exemplary block diagram of an architecture of a voice gateway 12d, a blog infolet 16 and associated databases. A few things are specific to voice based interactions, although they do not radically change the flow of information. In the context of blogging by voice, whether a user publishes an audio recording or retrieves a blog, all interactions (navigation menus) are presented via the voice telephony platform 300. When content is being requested by a voice device 302 (e.g., mobile phone, telephone, VoIP phone and the like), the content is provided by the HTTP gateway 12a via a VXML file that is interpreted in the voice telephony platform. The voice gateway 12d is used only when the blog infolet 16 autonomously decides to push out a phone call to the end user, for example, in the case where a user is subscribed for some events to be automatically delivered by the platform 10 as a notification service 304 (shown by the dotted line).

The voice telephony platform 300 manages calls via PSTN/Wireless/VoIP networks 304. The voice telephony platform basically operates as a VXML engine. The voice telephony platform 300 retrieves VXML content, which directs the dialog with the user, via HTTP from HTTP gateway 12a. The HTTP gateway 12a recognizes the HTTP requests as coming from a telephony platform 300 and creates the appropriate delivery context for the session; most importantly, the HTTP gateway 12a requests that the blog infolet 16 presents its functionality through VXML.

When content (a voice recording) is submitted by the user for publication in, for example, the user's blog, the content will appear to the HTTP gateway 12a as a multipart encoded form. Audio recordings can be converted to text using an external resource (ASR) and provided to and stored in the content database 40, if needed. Similar to other gateways 12, as part of the content processing, the content is published to the content server 40 and corresponding URLs are sent to the HTTP gateway 12a. This is true for all user interactions going through the HTTP gateway.

An exemplary method for publishing a wired or wireless telephone blog submission may be performed as follows. First, a user dials into a predetermined number in order to request publication of a voice originated blog information. The user may then be authenticated via a voice or user entered PIN. Alternatively, the user's device ID may automatically authenticate the user. A menu, via voice, via a popup screen, or other user interface is provided to the user's voice device 302 by the HTTP gateway 12a. Next the user selects the desired option from the menu, for example, "record a voice entry for my blog", and proceeds to speak into the voice device so that the content is recorded into the HTTP gateway 12a. The HTTP gateway 12a stores the content on the content server/database 40 and in return receives a URL providing the content's location. The blog infolet 16 is informed of the URL for the content published in the content server 40. And, the blog infolet sends a successful response to the user's voice device 302 via the HTTP gateway 12a and voice telephony platform 300. The user may also be queried to provide descriptors for annotations to the content that will aide in the categorization and searching of the content.

Retrieval of voice content from the exemplary platform 10 is a bit different from retrieving other types of content. VXML only allows for voice and text content (presented through TTS) to be included in the content presented to the user, thus a content selection step is needed to eliminate other types of content.

Another difference here is caused by the fact that voice content must be included by reference and text content must be included through inlining (inserting text into the VXML), which means that audio content will use the URLs. As such, the voice telephony platform 300 retrieves the audio content while the text content is directly retrieved by the blog infolet server 16 and included in the VXML sent to the HTTP gateway 12a and further onto the voice telephony platform 300.

An exemplary method of providing an audio segment from a blog in response to a user's voice request may comprise a user requesting to listen to a blog by dialing in to a predetermined number from a voice device 302. The user will then authenticate himself via an authentication processes. Next the user may be presented with an audio or visual menu provided by the HTTP gateway 12a via the voice telephony platform 300. The blog infolet 16 will then construct the presentation of stored audio content by referencing and inserting text components to be rendered by TTS. The voice telephony platform 300 will then fetch audio appropriate audio segments, according the provided URLs, from the content server 40 and play the content back to the user via the voice device 302 and the necessary connection 304.

Figure 2D:
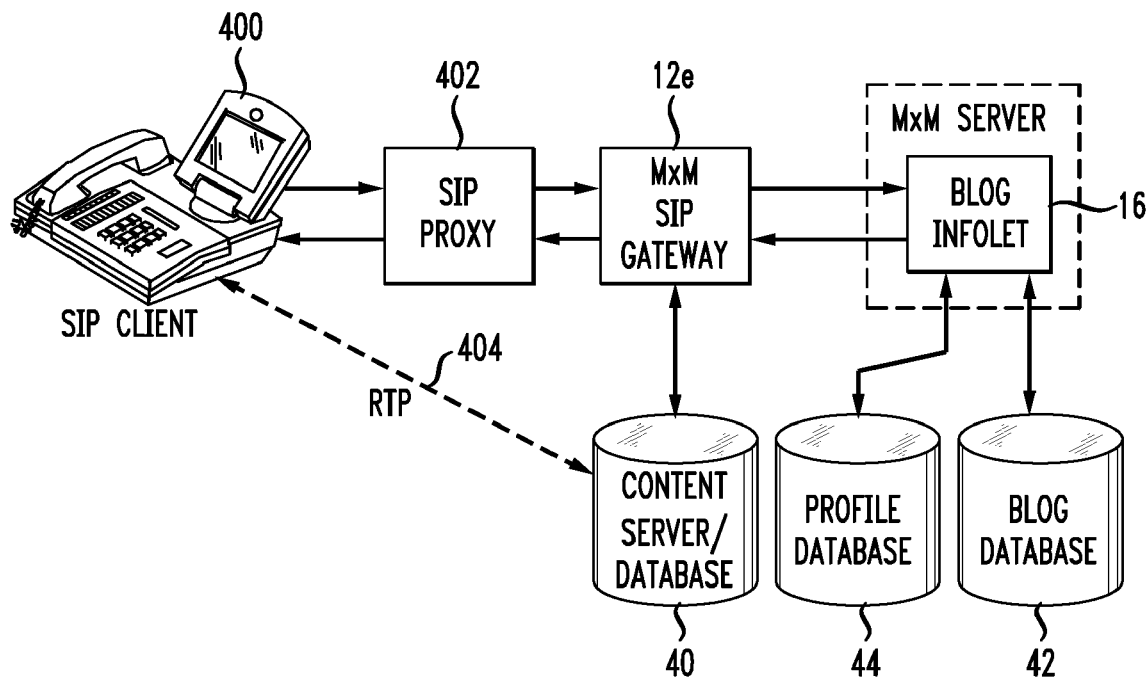
FIG. 2D is an exemplary block diagram architecture of session control and video retrieval through the SIP gateway and media server respectively, a blog infolet and associated databases.

FIG. 2D is an exemplary block diagram architecture of video publication and retrieval through the SIP gateway, a blog infolet and associated databases. For video publication, a SIP user agent (UA) 400 invites the SIP gateway UA 12e via an external SIP proxy 402. The SIP proxy 402 discovers SIP gateway UA 12e via a naming service (not specifically shown). The SIP gateway 12e instructs the content server 40 (or media server) to open an RTP session 404 with the SIP client 400 and stores the incoming video to a named file name therein. The SIP gateway 12e collects a URL for the stored file. The SIP gateway 12e then forwards the request and the collected URL pointing to the content to the blog infolet 16. This lets the blog infolet 16 know that a new item has been published and is referenced by the URL.

For video retrieval, the SIP user agent (UA) 400 invites the SIP gateway UA 12e via an external SIP proxy 402 to provide video content from a blog. The SIP proxy 402 discovers the SIP gateway UA 12e via a naming service. The SIP gateway 12e then forwards the video retrieval request to the blog infolet 16. The blog infolet 16 retrieves the user's page and aggregates information from other infolets or information sources (if necessary) based on the request. The blog infolet 16 uses an aggregator library to combine the various feeds into a single RSS feed and adapts them for delivery to the SIP gateway 12e. The SIP gateway 12e will then instruct the content server 40 (or media server), using the appropriate URL(s), to open an RTP session 404 with the SIP client 400 to send the video to the end user.

Figure 2E:
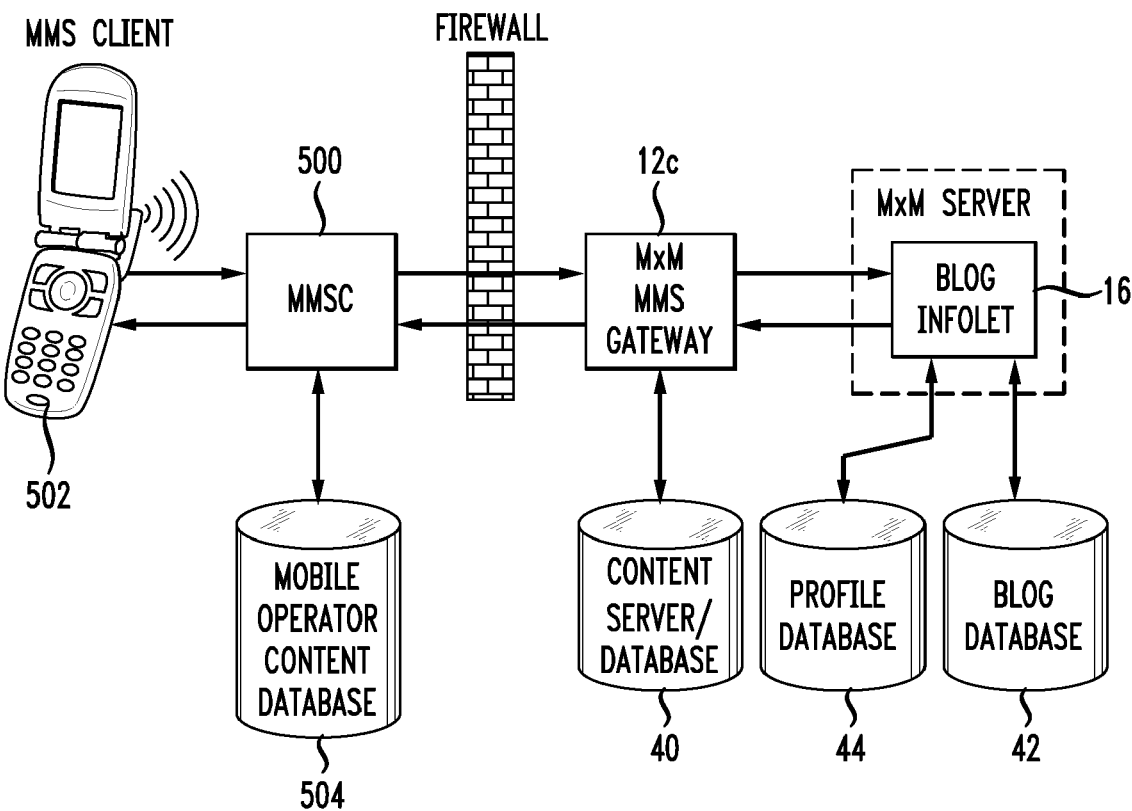
FIG. 2E is an exemplary block diagram architecture of a MMS gateway, a blog infolet and associated databases.
Figure 3:
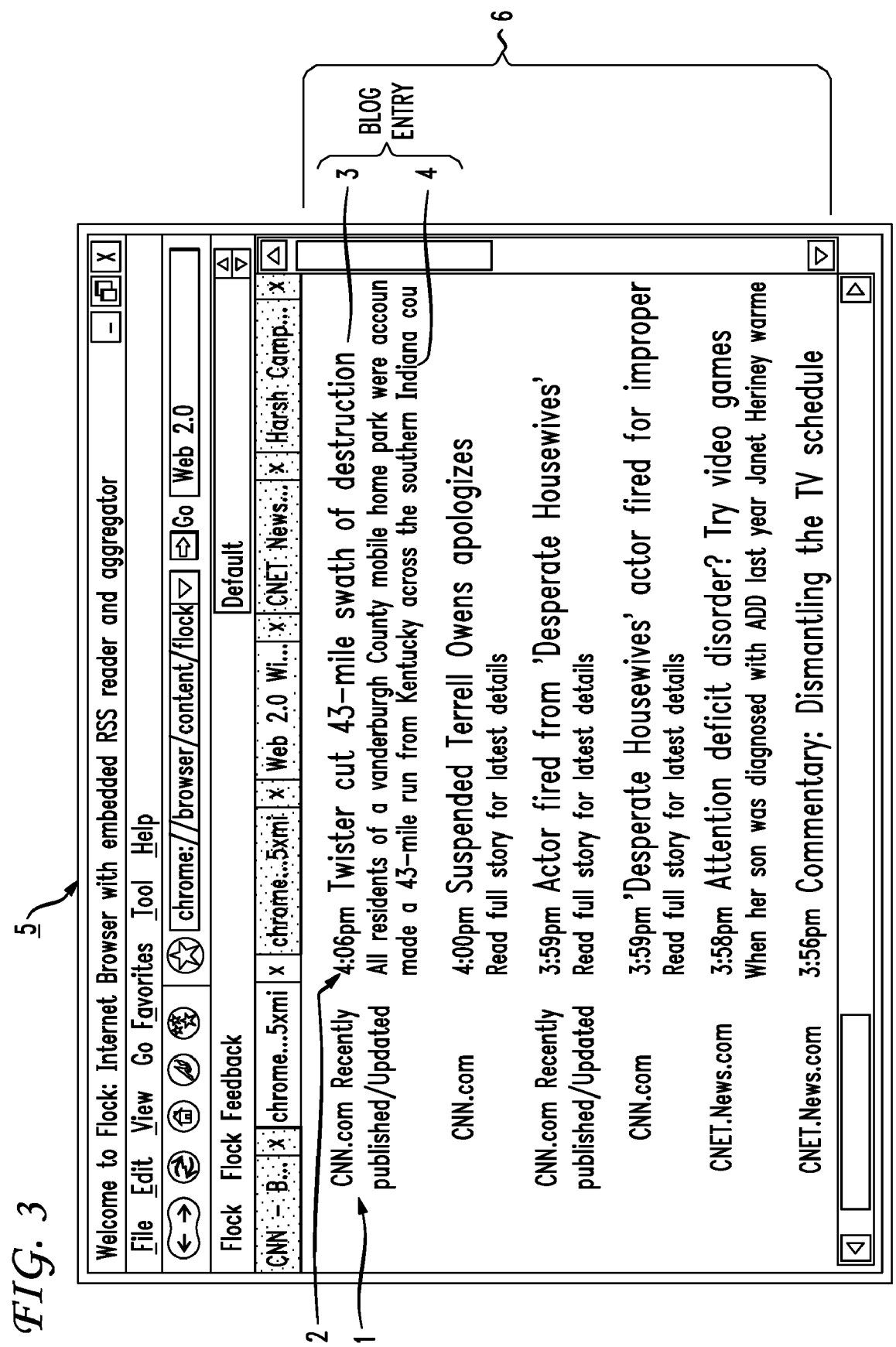
FIG. 3 is an example of an Internet browser, Flock [http://www.Flock.com], with an embedded RSS reader and aggregator.

FIG. 2E is an exemplary block diagram architecture of a MMS gateway 12c, the blog infolet 16 and associated databases. When content (a SMIL encoded MMS message with text/image/audio/video components) is submitted by the user for publication to a blog, it will appear to the MMS gateway 12c as a multipart encoded form. The MMS gateway 12c communicates via MM7 (or other standards like ParlayX) to a mobile operator MMSC 500. Similar to other gateways 12, as part of the content processing, the whole structure of this content (SMIL encoded message plus the components) will be published to the content server 40 and corresponding URLs will be sent in the request to the blog infolet 16. MMS messages are sent by associating the MMS gateway 12c and blog infolet 16 with a particular short code. Users can publish multimedia messages to the MMS gateway 12c. A response is sent back to the user by the platform 10 indicating success or failure.

For retrieval of multimedia information, users request a particular MMS message to be sent to, for example, their wireless device 502. The MMS gateway 12c communicates via MM7 (or other standards like ParlayX) to a mobile operator MMSC 500. SMIL content is assembled by the MMS gateway 12c or retrieved if previously published to the content server 40 and is sent to the MMSC 500. The SMIL content includes the actual components (not the references). The MMSC 500 stores the content locally in the operator's database 504. The user may then retrieve the content from the operator's database 504.

Referring back to FIG. 1, the blog infolet 16 assembles the blog entries from the user and stores the blog entries in the blog database 42 along with their associated blog item descriptions. The associated blog item descriptions point or are associated with data that is stored in the content database 40, that is associated with figures, video, and or audio data associated with a specific user. The blog database 42 stores the blog information items and associated annotations. The blog database 42 may be a relational database (RDB). Other formats for the blog database 42 could be used. An important aspect of the blog database 42 is that it is used to generate an RSS feed or feeds. This is important because later in the exemplary platform's process, the RSS aggregator infolet 38 aggregates RSS feeds. RSS feeds do not include video, audio, photograph, or graphic content, but instead are limited to specific RSS feed requirements and specifications. The RSS or MediaRSS (an extension for referring to and describing multimedia content associated with RSS items) content may include tags, pointers, or URLs (collectively "pointers") that provide the location of stored audio, video, or graphic content. The exemplary system 10 may also use other extensions with standard RSS. For example, such extensions may provide annotations to an entry with additional descriptive information about the entry. Thus, the pointers provided from the gateways 12, in association with the content server 40, allow a blog site to locate and find the associated video, audio, or picture information from the content server 40 at a later time using the RSS feed information because the pointers are part of or incorporated into the RSS feed.

To summarize, with respect to the blog infolet 16, it is important to understand that the blog infolet 16 stores or aids in the storage of blogging information. It stores content information in the content database 40. The blog infolet keeps text and related pointers that identify content or media content in a content database 40.

Referring now to infolets 14a-14c, these infolets can generally be instructed to turn on or become active on a periodic basis in order to collect information from a variety of information sources. The infolets 14a-14c may be collecting and providing information on a continuous basis, be activated and turned on at predetermined times, or might receive queries from the servers 22 requesting the collection of predetermined types of information. For example, infolet 14a is a sensor infolet in the exemplary embodiment. The sensor infolet 14a may collect information from sensor networks 26. A sensor network 26 may be a network of sensors that includes sensors for radio frequency identification (RFID), temperature, pressure, weather information, velocity information, acceleration information, health/medical condition of a patient, and substantially any information that can be provided by a sensor. Such sensors could be located geographically anywhere. As an example, assume an RFID sensor is being queried in the sensor network 26. If an RFID tag is attached to a person, who is a user and/or blogger, a sensor network 26 within, for example, the user's office building or university campus, may sense that the RFID tag on the user is nearby. Thus, the RFID sensor may send a signal through the sensor network 26 to infolet 14*a* indicating that the specific user is at or in a specific classroom in a particular building on a college campus. When the user with the RFID tag leaves the specific classroom, the sensor network may report to the infolet 14*a* that the specific user is no longer in the specified classroom in the building on the university campus. As the user moves around on the university campus, information can be received, in either a non-RSS format or in some circumstances in an RSS format, by the infolet 14*a* and then it converts information into an RSS feed when needed. Times, switch openings or closures, temperatures, pressures, flow rates, light intensity, weather readings, velocities or other sensor generated data can be retrieved from a sensor network. The RSS feed providing information about the user's location can then be used for updating the user's blog site. Sensors may also be used to collect real-time or near real-time information about physical entities (such as cars, buses, buildings, trains, aircraft, pool equipment, assembly lines, chemical plants, oil rigs, traffic conditions, etc) not just regular users, and the information may be used to update blogs on, or relating to these entities automatically in real or near real-time.

It should be understood that the user designates or defines aggregation attributes, which are stored and found in the user's service profile. A user's service profile may also comprise user defined blog item descriptors or "description schema". The attributes in a user's service profile may also include a user's defined blog item descriptors, which are values or categories for parameters that the infolets require in order to sort information in accordance with the user's service profile for a user's blog. It should also be understood that some edited and non-edited content that originates from sensor networks, location services, calendar services, etc, may have its own "description schema", which is used by the infolet covering the corresponding information source.

In addition, suppose that the same user walks off the college campus and out into an open field or other part of the city and is carrying a mobile phone or other mobile or wireless communication device. The mobile communication towers or system in the area may be able to locate the user's location and provide the user's location to the location service 24. The location service 24 would then provide the location information to infolet 14*b* along with a time stamp. Infolet 14*b* would then convert the information to an RSS format and provide an RSS feed stating that the user was located at a particular location at a recorded date and time. For example, user Dave was located at the New York La Guardia Airport at 10:30 a.m. on Jul. 2, 2006. The granularity of the information provided by the location service 24 or network sensors 26 depends on the actual location or sensor devices.

Infolets 14*a* and 14*b* provide RSS feeds that originate from unedited, non-RSS data sources while the blog infolet 16 provides additional blog information items to servers 22 from the gateways 12. These blog information items, after being converted into RSS feeds, can be sorted by the RSS aggregator infolet 38 by essentially any RSS structure element or description attribute defined or selected by the user. For example, the RSS feeds could be sorted by time stamps in accordance with the time that the feeds were created or generated. The RSS aggregator can sort or cluster the RSS feeds associated with a particular user by, for example, the length of the RSS feeds, the originating source device that created the RSS feeds, the geographical location where the RSS feed originated, tag data associated with the RSS feeds, the popularity of the RSS feed, the time of day that the RSS feed was generated, etc., or any combination thereof. Every RSS feed may have a plurality of attributes associated with it. Such attributes could be used for aggregating and/or sorting purposes. Attributes may include, but are not limited to originating source, time stamp, date, author, geographic location, service provider source, size, data type, licensee, licensor, country of origin, popularity, subject topic, gender, classification, index number, to name a few. An annotation structure can be defined either at the RSS level or at the RSS item level. In the case of the blog infolet, both annotation structures are user defined.

As such, an embodiment of the invention may provide a method of clustering RSS feeds, possibly containing additional feed and item descriptions. Some or all of the feeds might represent blog information items or have originated from a non-RSS data source through an infolet. Information from external RSS data sources can also be included. The common elements of an RSS feed together with those reflecting the description schema can be used as input dimensions to the clustering or matching process. In other embodiments, the description schema may have been predefined or prescribed by the original source of the data (e.g., a non-syndicated-style data source such as a digital camera or a syndicated data source such as CNN [http://www.cnn.com] or the Associated Press website [http://www.ap.org]. A broad set of clustering techniques and distance measures can be employed. The algorithm takes into account user defined preferences by assigning weights to each dimension in the multi-dimensional clustering or matching algorithm. As a result, an aggregated RSS feed is created that meets the user defined preferences of a user's blog site or data needs.

In another embodiment, a user may also request that a calendar source (not specifically shown) be used as another information source to provide user's appointment and/or calendar information either from any users' PDA (personal digital assistant) or electronic organizer or from a calendar server such as Microsoft Exchange Server. Such information could be received through an infolet 14 and could be provided to the servers 22 for storage as a blog information item. The information could then be aggregated by the RSS aggregator infolet 38.

The servers 22, in conjunction with the content database 40 and the blog database 42, store a plurality of formatted data structures from the various users of an exemplary platform 10. The various created RSS feeds are aggregated by the RSS aggregator infolet 38 into new RSS feeds. Embodiments of the present invention provide aggregated RSS feeds to multiple users. The RSS aggregator infolet 38 aggregates multiple different RSS feeds of different data sources for a variety of end users. Aggregation of the various feeds can be performed using load balancing techniques and/or with multiple aggregators handling the loads. A filtering mechanism can be used for aggregating the RSS feeds 28 or a simple filter that picks out all the data items that belong to a specific user, say user 1, while another simple filter picks out data items in the aggregated feed 28 for user 2.

At this point, the RSS feeds 28 coming out of the RSS aggregator infolet 38 can be provided to the publication infolet 30. The publication infolet 30 directs the appropriate aggregated RSS feeds to designated users' blog sites 32.

A user's blog site will select RSS data from the RSS aggregated feed and use the selected RSS data to help produce the user's blog site. For example, if a user is traveling through France and the user has set up his blog site to import selected RSS data from aggregated RSS data by a time stamp, the blog site may first show a picture of the Eiffel Tower, which was captured by the user's mobile phone camera and emailed to the email gateway 12b. Then it may include some text that the user sent via text messaging to the exemplary platform via the SMS or MMS gateway 12c. After that, the blog may include a piece of news that occurred on that particular day that had to do with the Eifel Tower and originated from an RSS news source 25. Next, the blog site may include a telephone message that was received by the voice gateway 12d and was transcribed into text via a voice-to-text module. After that, a short video clip may be provided wherein the user videotaped a street vender that he found interesting and forwarded to the appropriate gateways 12. Next, a sensor network (e.g., an RFID network) may have picked up that the user had actually entered into the Eifel Tower and provided the date and time when that occurred, along with the date and time that the user left the Eifel Tower. The user may then have entered a calendar appointment on his PDA that indicated that tomorrow he plans to visit the Louvre Museum to look at pictures and paintings at 2:30 pm and as such, this information may show up on the blog site so that those who are interested may know when to look at the blog site again for information and perhaps pictures of the blogger's visit to the Louvre Museum.

In additional embodiments of the invention, a delivery module inside the blog infolet 16 or the aggregator infolet 38 allows a person, who is interested in knowing what the particular blogger is doing, to request that information be "pushed" to his mobile device or desktop instead of having to actively access the particular blogger's site. The delivery module receives portions of the aggregated RSS feed intended for a particular user and sends the portions to the message switch 36. The message switch 36 will then, in turn, provide the selected portions of the RSS feed to the appropriate gateway device that was requested by the interested party or retrieved from the interested party's user profile. The gateway 12 forwards the information to the interested party's mobile or other requisite device.

For example, if Suzie is interested in what Bob is doing in Paris, Suzie may request via an exemplary network, that Bob's blogs, with respect to Paris, be forwarded to her mobile phone. As such, the appropriate RSS feeds would be provided through the delivery module, through the message switch 36, and to the various gateways 12. The gateways 12 forward the portions of the RSS feed that Suzie is interested in viewing via, perhaps, the email gateway 12b, the MMS gateway 12c, the voice gateway 12d, and maybe even the SIP gateway 12e, all which may be received by Suzie's mobile phone (assuming Suzie's mobile phone can process the various types of data). If Suzie only wanted the information to be received, for example, on her fax machine, Suzie may have requested that the appropriate RSS feeds, which could be sent to a fax machine, are sent through an appropriate fax gateway 12 (not specifically shown).

It should be understood that the aggregated RSS feeds created by embodiments of the present invention provide RSS content that is an aggregation of both edited and unedited RSS data, resulting in unedited content published directly to and on a blog site or provided to interested users via the various gateways 12. In the past, much RSS content was edited by a human before being provided as an RSS source. RSS feeds from, for example, original sensor network data or voice-to-text inputs originating from a consumer's mobile phone have never been available, but an unexpected need for such types of data is now present. Embodiments of the present invention use presently unorthodox sources of data, such as sensor networks, location services, unedited voice from mobile phones, as the sources for creating original and unedited RSS content that can be made to be searchable. Such items have not been used in the past to originate and generate unedited RSS content.

Each infolet, in embodiments of the invention, may contain an RSS conversion module that receives and understands the protocol of the data interface of the outside data source. The module receives data from an outside data source and converts the data to the RSS data format that is accepted by the exemplary platform's data interface. For example, infolet 14a understands the protocol of the information coming from the sensor networks and is able to transform that sensor network information into RSS content without human intervention. The RSS content will provide the pointers to a blog site so that the related non-text information (i.e., pictures, video and music, and audio) can be included in a published blog.

In another example, if a location service 24 is being used, there may be a location interface for a user to get location information out of the service (i.e., a location service Web site). Prior to embodiments of the present invention, there was no RSS content provided from location services. An exemplary location service infolet 14b would thus provide components that translate information service data into RSS formatted data. The location service infolet 14b gets information from a particular location source. Once the location infolet 14b gets the information from the location source, the location infolet 14b has a module that converts the location service information into RSS formatted content. The various infolets 14a-14c each are programmed to convert information from a non-RSS source (i.e., sensor networks, location services, calendar services, etc.) into RSS content. Once the infolet gets the information from the information source, it converts the information into a common RSS language. The RSS aggregator is used to aggregate RSS content that originates from a variety of sources for the user. Embodiments of the present invention enable a platform 10 to communicate with different information sources that do not provide RSS data or content and to convert the non-RSS content into RSS content for utilization by various blog users.

It should further be understood, that although the majority of embodiments described relate to RSS formatted data, it would be understood by one of ordinary skill in the art that embodiments of the invention would also work very well with and be obviously adaptable to operate with another accepted syndicated-style data format besides RSS, such as for example the ATOM-style data format or other newly created formats for use by syndicated data sources.

Although only certain embodiments of the apparatus of the present invention have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows:

What is claimed is:

1. A system for collecting, correlating and aggregating syndicated-format edited content with non-edited content, said system comprising:
    an infolet for receiving syndicated-format edited content, said syndicated-format edited content comprising standard source system attributes, an access gateway for receiving non-edited content, said non-edited content comprising non-text content;

a content processor that converts at least a portion of said non-text content into a text content, said content processor creates a set of description schema attributes, said description schema attributes being based on user-supplied input or information extracted from the non-text content;

a content database that stores said non-text content, said text content and said description schema attributes, said content database establishes non-text content pointers for the stored non-text content and text content pointers for the stored text content;

a blog infolet that provides a syndicated-style data presentation of a first user's web blog, said syndicated-style data presentation comprises at least one of said non-text pointers and said text pointers; and an aggregator infolet that correlates said syndicated-format edited content and said syndicated-style data using said standard source system attributes and said description schema attributes, into a correlated cluster set according to a second user's query, said aggregator infolet produces said correlated cluster as an aggregated syndicated-style data feed.

2. The system of claim 1, wherein said non-edited content is at least one of video content, audio content, graphic content, and facsimile machine generated content.

3. The system of claim 1, wherein said syndicated-format edited content is at least one of RSS content provided by a syndicated content source and Atom content provided by a syndicated content source.

4. The system of claim 1, wherein said access gateway is further for receiving user selected description information associated with said non-edited content, and wherein said description schema attributes for said non-text content comprise at least a portion of said user selected description information.

5. The system of claim 1, wherein said content processor extracts an attribute from said non-text content based on the contents of said text content, and wherein said description schema attributes has a descriptor filled by said attribute for said non-text content.

6. The system of claim 1, wherein said non-edited content comprises at least one of video content and graphic content, and wherein said content processor extracts at least one attribute from said non-text content based on an identification of an item identified in said non-text content.

7. The system of claim 6, wherein said description schema attributes for said non-text content comprises said item.

8. The system of claim 1, wherein said non-edited content comprises at least one of facsimile machine generated content and scanned text content; said system further comprises a character recognition module that receives said non-edited content and provides said text-content to said content processor.

9. The system of claim 8, wherein said character recognition module is part of said content processor.

10. The system of claim 1, wherein said non-edited content comprises audio information; said system further comprising a speech recognition module for converting at least a portion of said non-edited content received by said access gateway into said text content.

11. The system of said claim 1, wherein said first user's web blog is stored in a blog database.

12. The system of claim 11, wherein said blog database is part of said system.

13. The system of claim 1, wherein said syndicated-style data feed further comprises said description schema attributes.

14. The system of claim 1, wherein said aggregator infolet receives said second user's query and performs a search and correlation of said first user's web blog and said syndicated-format edited content based on a multidimensional correlation criteria, said multidimensional correlation criteria comprising said second user's query.

15. The system of claim 1, wherein said non-edited content originates from a consumer electronic device.

16. The system of claim 1, wherein said system receives said non-edited content from a non-syndicated data content source.

17. In a service platform system, a method of collecting, correlating and aggregating syndicated content and non-edited content, said method comprising:

receiving syndicated content, said syndicated content comprising source system attributes;

receiving non-edited content via an access gateway, said non-edited content comprising non-text content;

converting at least a portion of said non-text content into a text content;

providing said non-text content description schema attributes;

storing said non-text content in a content database with said description schema attribute, said stored non-text content having a first pointer;

providing a syndicated-style data feed to a first user's web blog, said syndicated-style data feed comprising said first pointer of said non-text content, said first user's web blog being stored in a blog database;

receiving a query from a second user;

correlating said standardized syndicated content, using said source system attributes, with said syndicated-style data feed, using said description schema attributes, into a cluster set using correlation criteria from said query;

presenting said cluster set as an aggregated syndicated-style data feed; and providing said aggregated syndicated-style data feed to said second user.

18. The method of claim 17, further comprising searching, after receiving said query, said blog database and said syndicated content using search attributes from said query.

19. The method of claim 17, wherein said syndicated content is in RSS.

20. The method of claim 17, wherein said aggregated syndicated-style data feed is in RSS.

21. The method of claim 17, wherein said non-text content comprises audio data and wherein converting is performed by an automatic speech recognition module.

22. The method of claim 17, wherein said non-text content is at least one of video data and graphic data, and wherein converting is performed by an image recognition module.

23. The method of claim 17, wherein the step of providing said non-text content a description schema attribute further comprises reviewing said text content for descriptor attributes for said description schema.

24. The method of claim 17, wherein said non-edited content is received by said service platform originating from a consumer electronic device.

25. The method of claim 17, wherein said non-edited content is received by said service platform and originated from a non-RSS data source.

26. The method of claim 17, wherein said first user provides said non-edited content along with additional classification information for said description schema attribute.

* * * * *